(12) United States Patent
Muramatsu

(10) Patent No.: US 12,205,770 B2
(45) Date of Patent: Jan. 21, 2025

(54) MULTILAYER CERAMIC CAPACITOR AND METHOD FOR MANUFACTURING MULTILAYER CERAMIC CAPACITOR

(71) Applicant: Murata Manufacturing Co., Ltd., Nagaokakyo (JP)

(72) Inventor: Satoshi Muramatsu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 134 days.

(21) Appl. No.: 18/104,321

(22) Filed: Feb. 1, 2023

(65) Prior Publication Data
US 2023/0260711 A1   Aug. 17, 2023

(30) Foreign Application Priority Data
Feb. 15, 2022   (JP) .................................. 2022-021683

(51) Int. Cl.
*H01G 4/30* (2006.01)
*H01G 4/008* (2006.01)
*H01G 4/012* (2006.01)
*H01G 4/12* (2006.01)

(52) U.S. Cl.
CPC .............. *H01G 4/30* (2013.01); *H01G 4/008* (2013.01); *H01G 4/012* (2013.01); *H01G 4/1227* (2013.01)

(58) Field of Classification Search
CPC ...... H01G 4/008; H01G 4/0085; H01G 4/012; H01G 4/1227; H01G 4/2325; H01G 4/30
See application file for complete search history.

(56) References Cited

U.S. PATENT DOCUMENTS

| | | | |
|---|---|---|---|
| 5,128,827 A * | 7/1992 | Yokotani | H01C 1/142 29/25.42 |
| 9,202,640 B2 * | 12/2015 | Zenzai | H01G 4/252 |
| 2006/0044098 A1 * | 3/2006 | Kimura | H01G 4/2325 336/122 |
| 2014/0111300 A1 * | 4/2014 | Park | H01G 4/30 336/200 |
| 2021/0098191 A1 | 4/2021 | Saito et al. | |

FOREIGN PATENT DOCUMENTS

| | | |
|---|---|---|
| JP | 3-94409 A | 4/1991 |
| JP | 2016-58719 A | 4/2016 |
| JP | 2019117942 A | 7/2019 |
| JP | 2021-34648 A | 3/2021 |

* cited by examiner

*Primary Examiner* — Nathan Milakovich
(74) *Attorney, Agent, or Firm* — Keating & Bennett, LLP

(57) ABSTRACT

A multilayer ceramic capacitor includes ceramic layers, internal electrodes, opposed principal surfaces, opposed end surfaces, and opposed side surfaces, and external electrodes on a surface of the capacitive body. The external electrodes include Ni and Sn, and have a C-shape on the end surface of the capacitive body and the principal surfaces when a section parallel to the side surfaces is viewed, the C-shape external electrodes include a first region and a second region completely surrounding the first region, an area of Sn is greater than or equal to about 90% with respect to a total of an area of Ni and the area of Sn, and in the first region, the area of Sn is less than about 90% with respect to the total of the area of Ni and the area of Sn appearing in a measurement region.

15 Claims, 5 Drawing Sheets

1000

MULTILAYER CERAMIC CAPACITOR AND METHOD FOR MANUFACTURING MULTILAYER CERAMIC CAPACITOR

CROSS REFERENCE TO RELATED APPLICATIONS

This application claims the benefit of priority to Japanese Patent Application No. 2022-021683 filed on Feb. 15, 2022. The entire contents of this application are hereby incorporated herein by reference.

BACKGROUND OF THE INVENTION

1. Field of the Invention

The present invention relates to a multilayer ceramic capacitor including at least two external electrodes on an outer surface of a capacitor body, and a method of manufacturing a multilayer ceramic capacitor.

2. Description of the Related Art

A multilayer ceramic capacitor is widely used in various electronic devices and electric devices. Japanese Patent Laid-Open No. 2016-58719 discloses a multilayer ceramic capacitor having a general structure. FIG. 5 illustrates a multilayer ceramic capacitor 1000 disclosed in Japanese Patent Laid-Open No. 2016-58719.

Multilayer ceramic capacitor 1000 includes a ceramic element body 103 (capacitive body) in which a dielectric layer 101 (ceramic layer) and an internal electrode 102 are laminated. External electrodes 104 are formed at both ends of ceramic element body 103.

External electrodes 104 have a multilayer structure including an external electrode body 105 formed by baking a conductive paste including, for example, Ni particles or the like, a first plating layer 106 made of, for example, Ni or the like, and a second plating layer 107 made of, for example, Sn or the like.

In conventional multilayer ceramic capacitor 1000, when first plating layer 106 and second plating layer 107 are formed, moisture including in a plating bath may enter ceramic element body 103 through external electrode body 105, and IR (insulation resistance) may be degraded.

SUMMARY OF THE INVENTION

Preferred embodiments of the present invention provide multilayer ceramic capacitors in each of which the moisture hardly infiltrates into a capacitive body when a plating layer is formed on the external electrode or when a completed product is used.

In the multilayer ceramic capacitor 1000 of Japanese Patent Laid-Open No. 2016-58719, the infiltration of the moisture into ceramic element body 103 (capacitive body) is prevented in a different manner from preferred embodiments of the present invention.

A multilayer ceramic capacitor according to a preferred embodiment of the present invention includes a capacitive body that includes a plurality of laminated ceramic layers and a plurality of internal electrodes, and includes a pair of principal surfaces opposed to each other in a height direction, a pair of end surfaces opposed to each other in a length direction orthogonal or substantially orthogonal to the height direction, and a pair of side surfaces opposed to each other in a width direction orthogonal or substantially orthogonal to the height direction and the length direction, and at least two external electrodes on a surface of the capacitive body, wherein each of the external electrodes includes Ni and Sn, each of the external electrodes has a C-shape on the end surface of the capacitive body and the principal surfaces connected to both sides of the end surface when a section parallel or substantially parallel to the side surface of the capacitive body is viewed, the section being obtained by cutting the capacitive body and each of the external electrodes at a length of about ½ of a dimension in the width direction of the capacitive body, each of the C-shape external electrodes includes a first region and a second region completely surrounding the first region, Sn is concentrated in the second region, and when a square measurement region of about 10 μm× about 10 μm is selected from the second region in the section, an area of Sn is greater than or equal to about 90% with respect to a total of an area of Ni and the area of Sn in the measurement region, and in the first region, when a square measurement region of about 10 μm× about 10 μm is selected from the first region in the section, the area of Sn is less than about 90% with respect to the total of the area of Ni and the area of Sn in the measurement region.

A method for manufacturing a multilayer ceramic capacitor according to a preferred embodiment of the present invention includes preparing an unfired capacitive body including a plurality of laminated ceramic green sheets and a plurality of internal electrode conductive paste layers, the unfired capacitive body including a pair of principal surfaces opposed to each other in a height direction, a pair of end surfaces opposed to each other in a length direction orthogonal or substantially orthogonal to the height direction, and a pair of side surfaces opposed to each other in a width direction orthogonal or substantially orthogonal to the height direction and the length direction, preparing an external electrode conductive paste including at least Ni particles and Sn particles, applying the external electrode conductive paste in a cap shape to at least the end surface of the unfired capacitive body and the principal surfaces and the side surfaces connected to the end surfaces, and simultaneously firing the unfired capacitive body and the external electrode conductive paste, in which, in the external electrode conductive paste, a weight of Sn particles is about 1 wt % to about 15 wt % with respect to a total of the weight of the Ni particles and the weight of the Sn particles.

In multilayer ceramic capacitors according to preferred embodiments of the present invention, moisture is prevented from entering the capacitive body when a plating layer is provided on the outer surface of the external electrode or when a completed product is used.

In addition, in multilayer ceramic capacitors according to preferred embodiments of the present invention, Sn that is excellent in solder wettability is concentrated in the second region on the outer surface of the external electrode, so that each of the multilayer ceramic capacitors can be used as it is without forming a plating layer on the outer surface of the external electrode. That is, without forming the plating layer on the outer surface of the external electrode, the external electrode can be bonded to a mounting electrode on a substrate or the like by, for example, reflow solder.

According to methods for manufacturing the multilayer ceramic capacitors according to preferred embodiments of the present inventions, multilayer ceramic capacitors according to preferred embodiments of the present invention can be manufactured with high productivity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
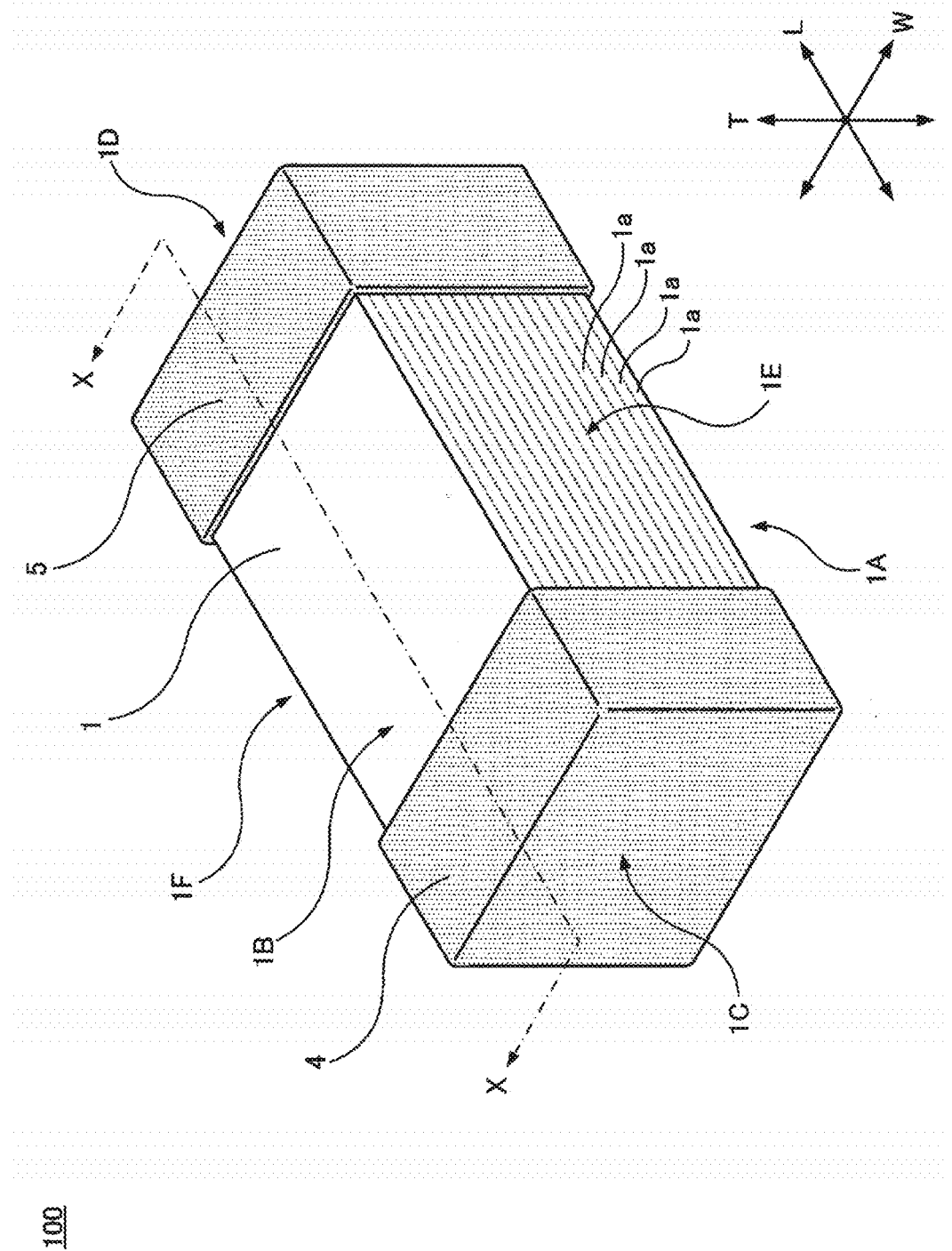
FIG. 1 is a perspective view illustrating a multilayer ceramic capacitor according to a preferred embodiment of the present invention.

Hereinafter, preferred embodiments of the present invention will be described with reference to the drawings.

Each preferred embodiment is merely an example of the present invention, and the present invention is not limited to the contents of the preferred embodiment. It is also possible to combine the contents described in the preferred embodiments, and the contents of such cases are also including in the present invention. The drawings are used to assist understanding of the specification, sometimes the drawing is schematically drawn, and a ratio of dimensions between drawn components may not match a ratio of their dimensions described in the specification. Sometimes the component described in the specification may be omitted in the drawings, or drawn with the number of components omitted.

First Preferred Embodiment

Figure 2:
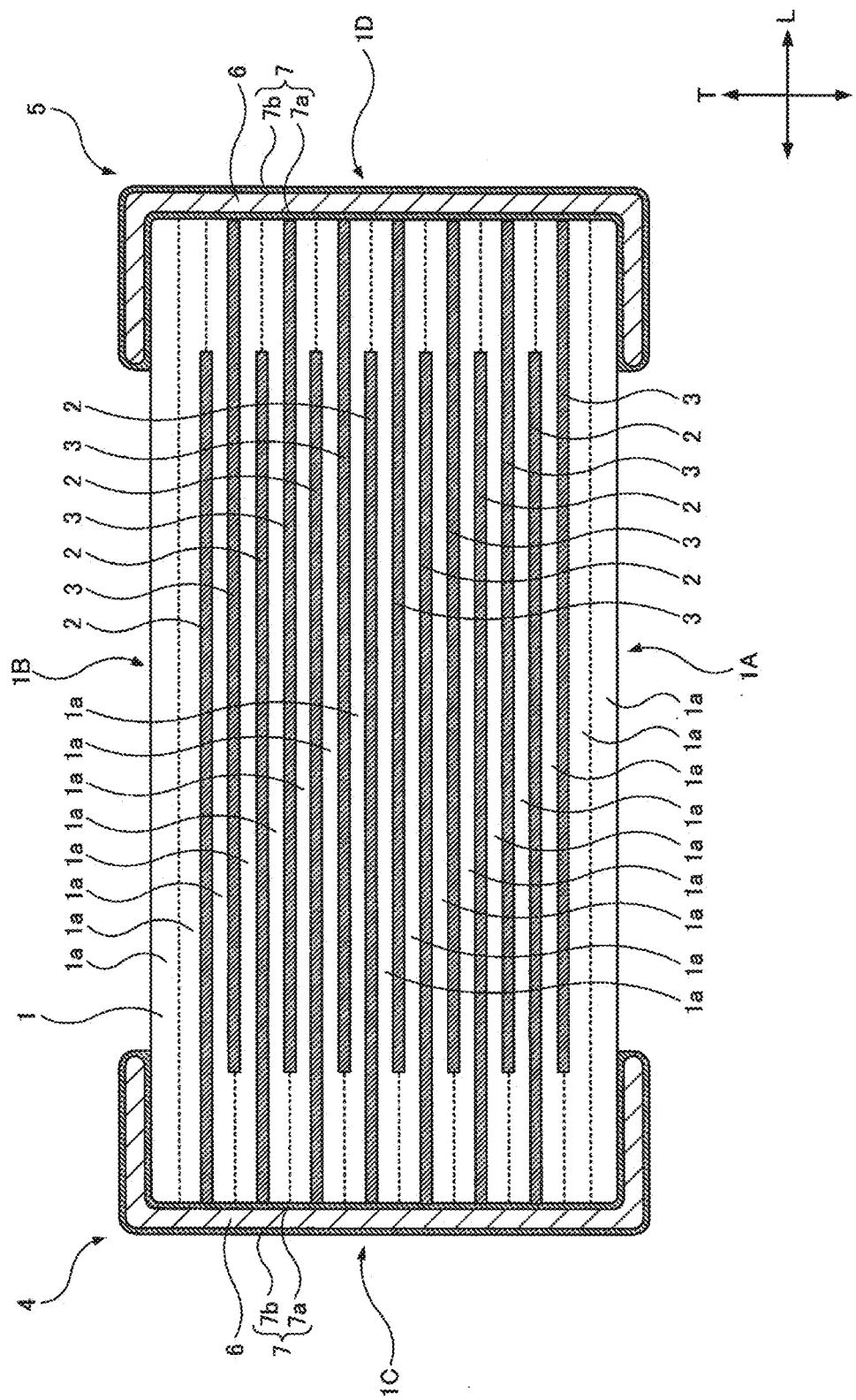
FIG. 2 is a sectional view illustrating a multilayer ceramic capacitor according to a preferred embodiment of the present invention.

FIGS. 1 and 2 illustrate a multilayer ceramic capacitor 100 according to a first preferred embodiment of a present invention. FIG. 1 is a perspective view of multilayer ceramic capacitor 100. FIG. 2 is a sectional view of multilayer ceramic capacitor 100.

A height direction T, a length direction L, and a width direction W of multilayer ceramic capacitor 100 are illustrated in the drawings, and sometimes these directions are referred to in the following description. In the first preferred embodiment, a laminating direction of a ceramic layers 1a described later is defined as height direction T of multilayer ceramic capacitor 100.

Multilayer ceramic capacitor 100 includes a capacitive body 1 having a rectangular or substantially rectangular parallelepiped shape. Capacitive body 1 includes a pair of principal surfaces 1A, 1B opposed to each other in height direction T, a pair of end surfaces 1C, 1D opposed to each other in length direction L orthogonal or substantially orthogonal to height direction T, and a pair of side surfaces 1E, 1F opposed to each other in width direction W orthogonal or substantially orthogonal to both height direction T and length direction L.

The sectional view in FIG. 2 is a sectional view of multilayer ceramic capacitor 100 parallel or substantially parallel to side surfaces 1E, 1F of capacitive body 1, cut at a length of about ½ of the dimension in width direction W of capacitive body 1, as indicated by an alternate long and short dash line arrow X-X in FIG. 1. This section is sometimes referred to as a first section.

The dimension of multilayer ceramic capacitor 100 is arbitrary. However, for example, the dimension in height direction T can be about 0.1 mm to about 2.5 mm. For example, the dimension in length direction L can be about 0.1 mm to about 3.2 mm. For example, the dimension in width direction W can be about 0.1 mm to about 2.5 mm.

Capacitive body 1 is formed by laminating a plurality of ceramic layers 1a and a plurality of internal electrodes 2, 3.

The material of capacitive body 1 (ceramic layer 1a) is arbitrary, and for example, a dielectric ceramic mainly including $BaTiO_3$ can be used. Alternatively, for example, a dielectric ceramic mainly including other materials such as $CaTiO_3$, $SrTiO_3$, $CaZrO_3$ may be used instead of $BaTiO_3$.

The thickness of ceramic layer 1a is arbitrary, and for example, can be about 0.3 μm to about 2.0 μm in an effective region for capacitance formation in which internal electrodes 2, 3 are provided.

The number of ceramic layers 1a is arbitrary, but for example, it can be 1 layer to 6000 layers in the effective region for the capacitance formation in which internal electrodes 2, 3 are formed.

On both upper and lower sides of capacitive body 1, internal electrodes 2, 3 are not provided, but outer layers (protective layers) including only ceramic layers 1a are provided. The thickness of the outer layer is arbitrary, and for example, can be about 15 μm to about 150 μm. The thickness of ceramic layer 1a in the outer layer region may be larger than the thickness of ceramic layer 1a in the effective region for the capacitance formation in which internal electrodes 2, 3 are provided (however, in FIG. 2, the thickness of ceramic layer 1a is illustrated to be the same or substantially the same in the outer layer region and the effective region). The material of ceramic layer 1a in the outer layer region may be different from the material of ceramic layer 1a in the effective region.

The material of the main component of internal electrodes 2, 3 is arbitrary, and, for example, Ni is used in the first preferred embodiment. Alternatively, other metals such as, for example, Cu, Ag, Pd, Au may be used instead of Ni. Ni, Cu, Ag, Pd, Au, and the like and other metals may be alloys with other metals.

The thicknesses of internal electrodes 2, 3 are arbitrary, and for example, can be about 0.3 μm to about 1.5 μm.

A gap dimension between internal electrodes 2, 3 and side surfaces 1E, 1F of capacitive body 1 is arbitrary, but, for example, can be about 10 μm to about 200 μm. In addition, the gap dimension between internal electrode 3 and end surfaces 1C, 1D of capacitive body 1 is arbitrary, but for example, can be about 0.5 μm to about 300 μm.

External electrodes 4, 5 are provided on the outer surface of capacitive body 1.

External electrode 4 is provided on end surface 1C of capacitive body 1. External electrode 4 has a cap shape, and an edge portion extends from end surface 1C of capacitive body 1 to principal surfaces 1A, 1B and side surfaces 1E, 1F.

External electrode 5 is provided on end surface 1D of capacitive body 1. External electrode 5 has a cap shape, and the edge portion extends from end surface 1D of capacitive body 1 to principal surfaces 1A, 1B and side surfaces 1E, 1F.

In multilayer ceramic capacitor 100, internal electrode 2 extending to end surface 1C of capacitive body 1 is connected to external electrode 4. Internal electrode 2 extending to end surface 1D of capacitive body 1 is connected to external electrode 5.

External electrode 4 and external electrode 5 have the same or substantially the same structure.

When the first section of multilayer ceramic capacitor 100 in FIG. 2 is viewed, each of external electrodes 4, 5 has a C-shape. It can also be said that each of external electrodes 4, 5 has a U-shape.

In the first section of FIG. 2, each of external electrodes 4, 5 includes a first region 6 and a second region 7. In the first preferred embodiment, second region 7 completely surrounds first region 6.

Second region 7 includes an inner region 7a in contact with capacitive body 1 and an outer region 7b that is not in contact with capacitive body 1.

Each of first region 6 and second region 7 includes Ni and Sn. However, second region 7 is a region in which Sn is concentrated, and, for example, an area of Sn is greater than or equal to about 90% with respect to the total of the area of Ni and the area of Sn appearing in a square measurement region of about 10 μm× about 10 μm which is arbitrarily selected from second region 7 appearing in the first section. On the other hand, for example, in first region 6, the area of Sn is less than about 90% with respect to the total of the area of Ni and the area of Sn appearing in a square measurement region of about 10 μm× about 10 μm which is arbitrarily selected from first region 6 appearing in the first section. The area of Ni and the area of Sn are measured by calculation from a detection ratio of each atom in composition analysis with a scanning electron microscope.

Although a boundary between first region 6 and second region 7 may be unclear, even in such a case, second region 7 completely surrounds first region 6 in the multilayer ceramic capacitor 100.

From another point of view, in external electrodes 4, 5 in the first section, the area occupied by Sn per unit area is larger on the outer side (the side that is in contact with capacitive body 1 and/or the side that is in contact with an atmosphere) and smaller on the inner side.

The thicknesses of external electrodes 4, 5 are arbitrary, and for example, can be about 5 μm to about 150 μm. The thickness of first region 6 and the thickness of second region 7 (the thickness of inner region 7a or/and the thickness of outer region 7b) are also arbitrary. However, while an external electrode conductive paste that is included in external electrodes 4, 5 includes Ni particles and Sn particles, the thickness (the thickness of inner region 7a or/and the thickness of outer region 7b) of second region 7 increases as the ratio of the weight of Sn particles to the total weight of the including Ni particles and Sn particles in the starting material increases.

In multilayer ceramic capacitor 100 of the first preferred embodiment having the above structure, Sn that is excellent in solder wettability is concentrated in second region 7 (outer region 7b) on the outer surfaces of external electrodes 4, 5, so that it can be used as it is without forming the plating layer on the outer surfaces of external electrodes 4, 5. That is, external electrodes 4, 5 have sufficient solder wettability without forming the plating layer on the outer surfaces of external electrodes 4, 5, so that external electrodes 4, 5 can be bonded to a mounting electrode or the like (not illustrated) of the substrate by, for example, reflow solder.

In this case, multilayer ceramic capacitor 100 can reduce an overall dimension and/or increase electrostatic capacitance by an amount of no plating layer provided on external electrodes 4, 5. That is, in general, the dimension of the electronic component is defined to include the dimension of the external electrode including the plating layer. However, (a) when the electrostatic capacitance is constant, the overall dimension can be reduced by the amount of no plating layer provided on external electrodes 4, 5, and (b) when the overall dimension is constant, the electrostatic capacitance can be increased by increasing the dimension of capacitive body 1 by the amount of no plating layer provided on external electrodes 4, 5.

Multilayer ceramic capacitor 100 can be used after providing one or a plurality of plating layers on external electrodes 4, 5. For example, an Sn plating layer can be provided on the outer surface of outer region 7b of second region 7 of external electrodes 4, 5. Alternatively, on the outer surface of outer region 7b of second region 7 of external electrodes 4, 5, the Ni plating layer may be provided as the first layer, and the Sn plating layer may be provided as the second layer. The number of layers and the material of the plating layer are not limited thereto, and can be variously changed.

In multilayer ceramic capacitor 100, the infiltration of the moisture into capacitive body 1 is prevented when the plating layer is provided on external electrodes 4, 5. This advantageous effect will be described in detail below (moisture resistance load test), but it is considered that inner region 7a in which Sn is concentrated in second region 7 of external electrodes 4, 5 greatly contributes to the prevention of the entry of the moisture into capacitive body 1. As for a degree of concentration of Sn in second region 7, it is considered that the area of Sn greater than or equal to about 90% with respect to the total of the area of Ni and the area of Sn is a necessary and sufficient condition.

Example of Method for Manufacturing Multilayer Ceramic Capacitor

Figure 3A:
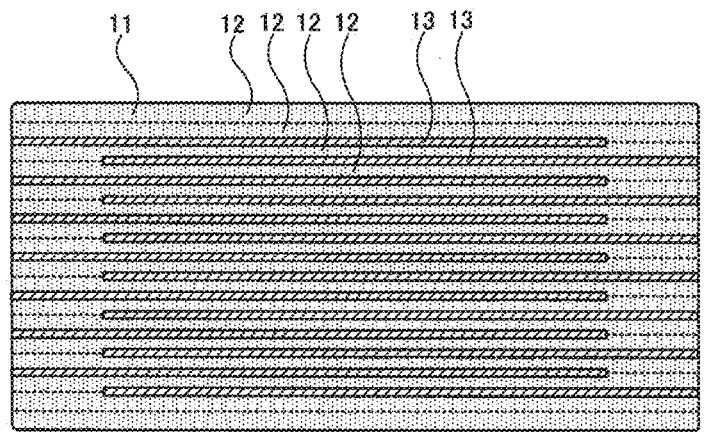
FIGS. 3A to 3C are sectional views illustrating processes performed in an example of a method for manufacturing the multilayer ceramic capacitor according to a preferred embodiment of the present invention.
Figure 3B:
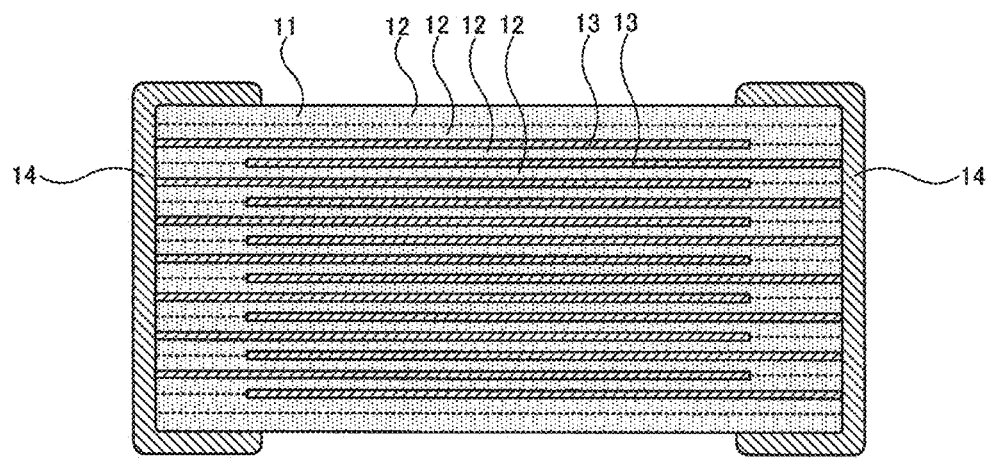
Figure 3C:
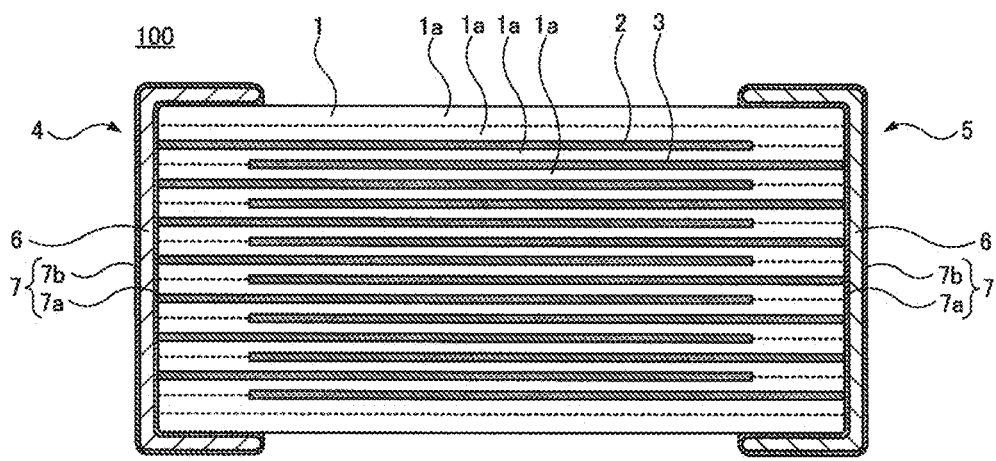

With reference to FIGS. 3A to 3C, a non-limiting example of a method for manufacturing multilayer ceramic capacitor 100 according to the first preferred embodiment will be described.

In an actual multilayer ceramic capacitor manufacturing line, it is common to collectively manufacture a large number of multilayer ceramic capacitors using a mother ceramic green sheet. However, for convenience of description here, the case of manufacturing one multilayer ceramic capacitor will be described as an example.

First, an unfired capacitive body 11 in FIG. 3A is prepared.

Although illustration is omitted, for example, a dielectric ceramic powder, a binder resin, a solvent, and the like are provided, and wet-mixed to prepare ceramic slurry.

Subsequently, the ceramic slurry is applied on a carrier film in a sheet shape using, for example, a die coater, a gravure coater, a microgravure coater, or the like, and dried to prepare a ceramic green sheet 12.

Subsequently, in order to form internal electrodes 2, 3 on the principal surfaces of predetermined ceramic green sheets 12, an internal electrode conductive paste prepared in advance is applied (for example, printed) in a desired pattern shape to form an internal electrode conductive paste layer 13. However, the internal electrode conductive paste is not applied to the ceramic green sheet 12 that becomes an outer layer. For example, a mixture of metal particles (Ni particles or the like), a binder resin, a solvent, and the like can be used as the internal electrode conductive paste.

Subsequently, ceramic green sheets 12 are laminated in a predetermined order, and integrated by heating and pressing to form unfired capacitive body 11 in FIG. 3A.

Subsequently, the external electrode conductive paste is prepared. The external electrode conductive paste includes Ni particles and Sn particles. For example, the external electrode conductive paste further includes a binder resin, a solvent, and the like. The external electrode conductive paste may include a glass component, for example. These materials are mixed to prepare the external electrode conductive paste. The blending ratio of the Ni particles and the Sn particles, the binder resin, the solvent, and the like can be appropriately selected.

However, the external electrode conductive paste in the first preferred embodiment includes more Sn particles than Ni particles in weight. Specifically, the external electrode conductive paste includes, for example, about 1 wt % to about wt % of Sn particles when the total of the weight of the Ni particles and the weight of the Sn particles is 100 wt %. This is because second region 7 completely surrounds first region 6 in the first section in FIG. 2. That is, when the amount of Sn particles is insufficient in the external electrode conductive paste, the formation of second region 7 in which Sn is concentrated becomes insufficient. This is because, for example, when the Sn particles are insufficient, even when outer region 7b is formed as second region 7, sometimes inner region 7a is incompletely formed or inner region 7a is not formed. The incomplete formation of inner region 7a means that inner region 7a is not continuously formed but is intermittently formed.

Subsequently, as illustrated in FIG. 3B, an external electrode conductive paste 14 is applied in a cap shape to each of the end including end surface 1C and the end including end surface 1D of unfired capacitive body 11.

Subsequently, unfired capacitive body 11 (ceramic green sheet 12, internal electrode conductive paste layer 13) and external electrode conductive paste 14 are simultaneously fired. As a result, as illustrated in FIG. 3C, ceramic green sheet 12 becomes capacitive body 1, internal electrode conductive paste layer 13 becomes internal electrodes 2, 3, and external electrode conductive paste 14 becomes external electrodes 4, 5.

Each of external electrodes 4, 5 has a C-shape when the first section is viewed. When the first section is viewed, external electrodes 4, 5 include first region 6 and second region 7, and second region 7 completely surrounds first region 6. Sn included in external electrode conductive paste 14 is melted and segregated on the external side (the side in contact with capacitive body 1 and the side in contact with the atmosphere) of external electrodes 4, 5 during firing, thus forming second region 7 in which Sn is concentrated. In multilayer ceramic capacitor 100 of the first preferred embodiment, second region 7 is effectively formed, second region 7 includes inner region 7a in contact with capacitive body 1 and outer region 7b not in contact with capacitive body 1, and second region 7 completely surrounds first region 6 including inner region 7a and outer region 7b.

In order to effectively form second region 7, the external electrode conductive paste preferably includes, for example, about 1 wt % to about 15 wt % of Sn particles when the total of the weight of the Ni particles and the weight of the Sn particles is 100 wt %. A temperature at which unfired capacitive body 11 (ceramic green sheet 12, internal electrode conductive paste layer 13) and external electrode conductive paste 14 are simultaneously fired is preferably, for example, greater than or equal to about 232° C. that is the melting temperature of Sn, and lower than about 1455° C. that is the melting temperature of Ni. When the above two conditions are satisfied, the Sn particles are not insufficient, and alloying of the Ni particles and the Sn particles is also prevented, so that second region 7 is effectively formed. When the alloying of the Ni particles and the Sn particles progresses, Sn particles are not concentrated in the regions of external electrodes 4, 5 in contact with capacitive body 1, and inner region 7a is not formed.

Consequently, multilayer ceramic capacitor 100 of the first preferred embodiment is completed.

Moisture Resistance Load Test

In order to confirm the effectiveness of preferred embodiments of the present invention, the following moisture resistance load test was performed.

First, multilayer ceramic capacitor 100 of the first preferred embodiment was prepared and used as a sample of the example. The external electrode conductive paste used for preparing the sample of the example includes about 15 wt % of Sn particles when the total of the weight of the Ni particles and the weight of the Sn particles is 100 wt %. The number of samples produced according to the example was 100.

For comparison, a multilayer ceramic capacitor with a portion of the configuration of multilayer ceramic capacitor 100 modified was prepared and used as a sample according to a comparative example. An external electrode conductive paste having a larger content of Sn particles than that used for the preparation of multilayer ceramic capacitor 100 was used in the preparation of the sample of the comparative example. Specifically, in the preparation of the sample of the comparative example, an external electrode conductive paste including about 30 wt % of Sn particles was used when the total of the weight of Ni particles and the weight of Sn particles was 100 wt %. The number of samples produced according to the comparative example was 101.

One multilayer ceramic capacitor of the sample of the prepared comparative example was cut at the same portion as the first section, and the state of the section of the external electrode was examined. In the sample of the comparative example, the first region was formed in the external electrode. However, in the second region in which Sn is concentrated, the outer region not in contact with the capacitive body is formed, but the inner region in contact with the capacitive body is incompletely formed. Specifically, the inner region was formed only partially and discontinuously with a small thickness. As a result, in the multilayer ceramic capacitor of the sample of the comparative example, the first region is incompletely surrounded by the second region.

Subsequently, 100 samples of each of the example and the comparative example were mounted on a glass epoxy substrate using eutectic solder. Subsequently, the insulation resistance value of each sample was measured.

Subsequently, the glass epoxy substrate was placed in a high temperature and high humidity bath, and a voltage of about 3.2 V was applied to each sample for about 72 hours under an environment of about 125° C. and a relative humidity of about 95% RH. Then, the insulation resistance value of each sample after the moisture resistance test was measured.

In each sample, samples in which the insulation resistance value decreased by at least one digit before and after the moisture resistance load test were counted as defectives. As a result, among the 100 samples of the example, zero sample was determined to be defective. On the other hand, in the sample of the comparative example, 10 out of 100 samples were determined to be defective.

The effectiveness of preferred embodiments of the present invention was confirmed by the above humidity load test. That is, in multilayer ceramic capacitor 100, it was confirmed that inner regions 7a of second regions 7 of external electrodes 4, 5 greatly contribute to the prevention of the entry of the moisture into capacitive body 1 when the plating layer is formed on the outer surfaces of external electrodes 4, 5 or when a completed product is used.

Second Preferred Embodiment

Figure 4:
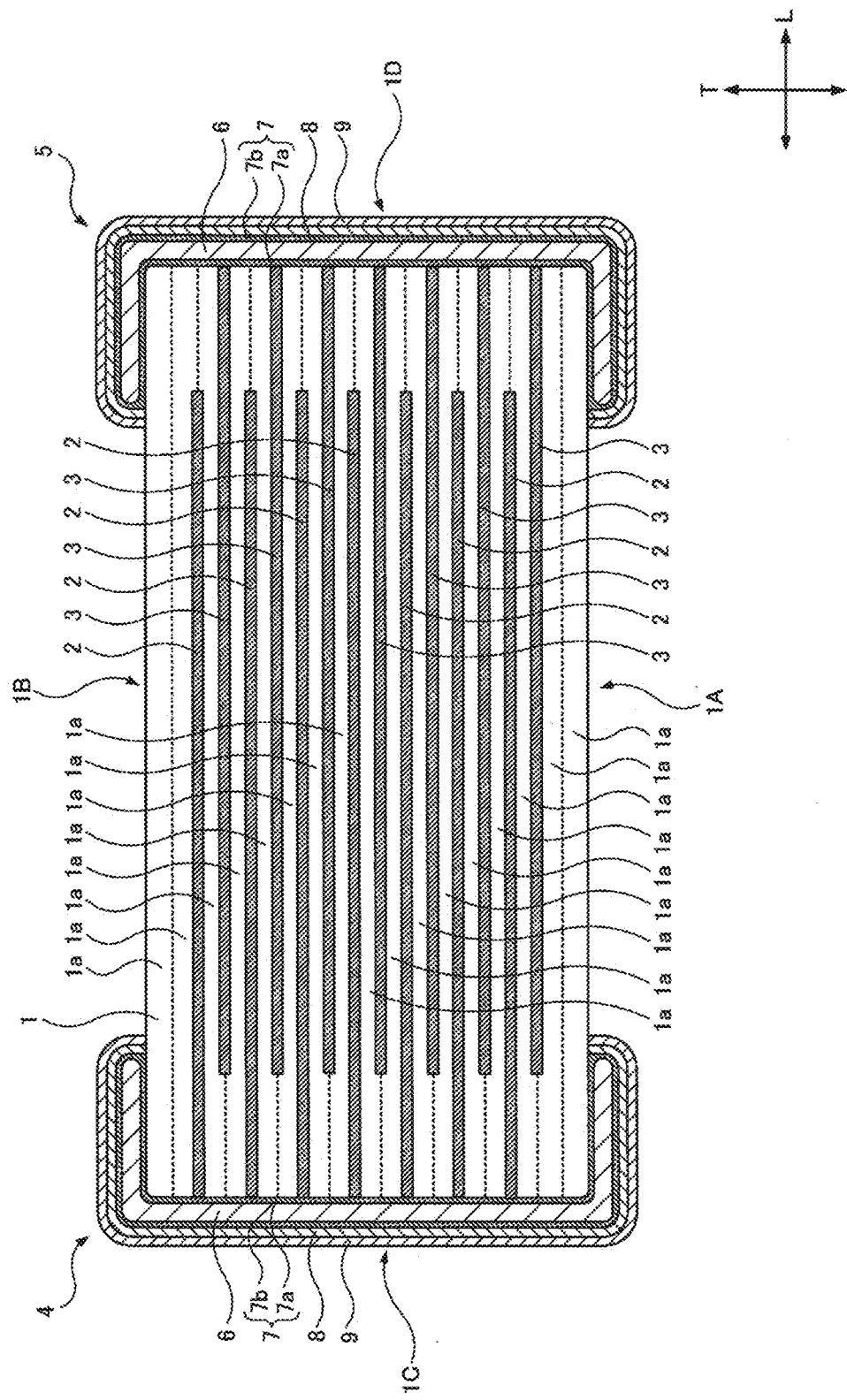
FIG. 4 is a sectional view illustrating a multilayer ceramic capacitor according to a preferred embodiment of the present invention.
Figure 5:
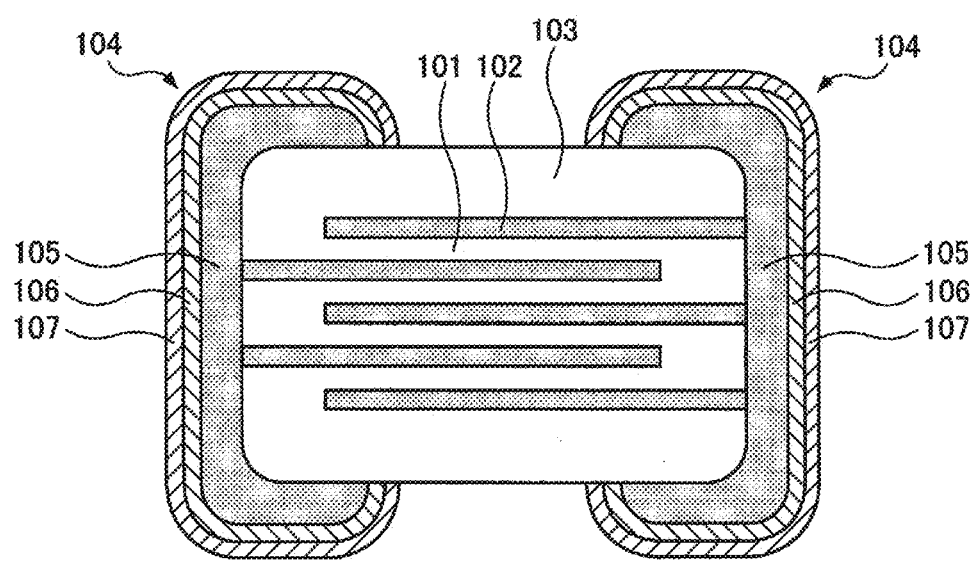
FIG. 5 is a sectional view illustrating a conventional multilayer ceramic capacitor.

FIG. 4 illustrates a multilayer ceramic capacitor 200 according to a second preferred embodiment of the present invention. FIG. 4 is a sectional view illustrating multilayer ceramic capacitor 200. More specifically, FIG. 4 illustrates a section parallel or substantially parallel to side surfaces 1E, 1F of capacitive body 1, the section being obtained by cutting multilayer ceramic capacitor 200 at a length of about ½ of the dimension in width direction W of capacitive body 1. This cross section is sometimes referred to as a second section.

In multilayer ceramic capacitor 200 of the second preferred embodiment, a new configuration is added to multilayer ceramic capacitor 100 of the first preferred embodiment. Specifically, in multilayer ceramic capacitor 100, no plating layer was provided on the outer surfaces of external electrodes 4, 5. On the other hand, in multilayer ceramic capacitor 200, a Ni plating layer 8 is provided as a first layer on the outer surfaces of external electrodes 4, 5, and an Sn plating layer 9 is provided as a second layer. Other configurations of multilayer ceramic capacitor 200 are the same or substantially the same as those of multilayer ceramic capacitor 100.

Also in multilayer ceramic capacitor 200, when the second section is viewed, second region 7 that is a region in which Sn is concentrated completely surrounds first region 6 in external electrodes 4, 5.

In multilayer ceramic capacitor 200, second regions 7 (particularly, inner regions 7a) of external electrodes 4, 5 prevent the moisture from entering the inside of capacitive body 1 when Ni plating layer 8 or Sn plating layer 9 is formed, or when the completed product is used.

The multilayer ceramic capacitors of the preferred embodiments are described above. However, the present invention is not limited to the contents described above, and various changes can be made in accordance with the scope of the invention.

For example, in the above preferred embodiments, the multilayer ceramic capacitor includes the two external electrodes, but the number of external electrodes may be increased to provide a multilayer ceramic capacitor including three terminals or the like.

A multilayer ceramic capacitor according to a preferred embodiment of the present invention is as described in the SUMMARY OF THE INVENTION.

In this multilayer ceramic capacitor, the second region preferably includes an inner region in contact with the capacitive body and an outer region not in contact with the capacitive body. In this case, the moisture resistance of the multilayer ceramic capacitor can be improved by the inner region. In addition, the solder wettability of the external electrode can be improved by the outer region.

It is also preferable that at least one plating layer is provided on the outer surface of the outer region of the second region. In this case, the plating layer can include the Sn plating layer. Furthermore, the plating layer can include the Ni plating layer and the Sn plating layer provided on the outer surface of the Ni plating layer.

In addition, it is also preferable that the area occupied by Sn per unit area of the external electrode is larger on the outer side and smaller on the inner side when the section is viewed. Also in this case, it is possible to prevent the moisture from entering the capacitive body.

A method for manufacturing the multilayer ceramic capacitor according to a preferred embodiment of the present invention is as described in the SUMMARY OF THE INVENTION.

In this method for manufacturing the multilayer ceramic capacitor, the firing temperature is preferably greater than or equal to the melting temperature of Sn and less than the melting temperature of Ni. In this case, the second region can be effectively formed in the external electrode.

Although preferred embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A multilayer ceramic capacitor comprising:
    a capacitive body including a plurality of laminated ceramic layers, a plurality of internal electrodes, a pair of principal surfaces opposed to each other in a height direction, a pair of end surfaces opposed to each other in a length direction orthogonal or substantially orthogonal to the height direction, and a pair of side surfaces opposed to each other in a width direction orthogonal or substantially orthogonal to the height direction and the length direction; and
    at least two external electrodes on a surface of the capacitive body; wherein
    each of the external electrodes includes Ni and Sn;
    each of the external electrodes has a C-shape on the end surface of the capacitive body and the principal surfaces connected to both sides of the end surface when a section parallel or substantially parallel to the side surface of the capacitive body is viewed, the section being obtained by cutting the capacitive body and each of the external electrode at a length of about ½ of a dimension in the width direction of the capacitive body;
    each of the C-shape external electrodes includes a first region and a second region completely surrounding the first region;
    Sn is concentrated in the second region, and, when a square measurement region of about 10 μm× about 10 μm is selected from the second region in the section, an area of Sn is greater than or equal to about 90% with respect to a total of an area of Ni and the area of Sn in the measurement region; and
    in the first region, when a square measurement region of about 10 μm× about 10 μm is selected from the first region in the section, the area of Sn is less than about 90% with respect to the total of the area of Ni and the area of Sn appearing in the measurement region.

2. The multilayer ceramic capacitor according to claim 1, wherein the second region includes an inner region in contact with the capacitive body and an outer region not in contact with the capacitive body.

3. The multilayer ceramic capacitor according to claim 2, wherein at least one plating layer is provided on an outer surface of the outer region of the second region.

4. The multilayer ceramic capacitor according to claim 3, wherein the plating layer includes an Sn plating layer.

5. The multilayer ceramic capacitor according to claim 4, wherein the plating layer includes:
    a Ni plating layer; and
    the Sn plating layer on an outer surface of the Ni plating layer.

6. The multilayer ceramic capacitor according to claim 1, wherein, in each of the external electrodes, the area occupied by Sn per unit area is larger on an outer side and smaller on an inner side when the section is viewed.

7. The multilayer ceramic capacitor according to claim 1, wherein the multilayer ceramic capacitor has the dimension in height direction of about 0.1 mm to about 2.5 mm, a dimension in length direction of about 0.1 mm to about 3.2 mm, and a dimension in width direction of about 0.1 mm to about 2.5 mm.

8. The multilayer ceramic capacitor according to claim 1, wherein each of the plurality of ceramic layers includes $BaTiO_3$.

9. The multilayer ceramic capacitor according to claim 1, wherein a thickness of each of the plurality of ceramic layers is about 0.3 μm to about 2.0 μm in an effective region including the plurality of internal electrodes.

10. The multilayer ceramic capacitor according to claim 1, wherein each of the plurality of internal electrodes includes Ni.

11. The multilayer ceramic capacitor according to claim 1, wherein a thickness of each of the plurality of internal electrodes is about 0.3 μm to about 1.5 μm.

12. The multilayer ceramic capacitor according to claim 1, wherein a gap dimension between each of the plurality of internal electrodes and a respective one of the side surfaces is about 10 μm to about 200 μm.

13. The multilayer ceramic capacitor according to claim 1, wherein a gap dimension between each of the plurality of internal electrodes and a respective one of the end surfaces is about 0.5 μm to about 200 μm.

14. A method for manufacturing a multilayer ceramic capacitor, the method comprising:
preparing an unfired capacitive body including a plurality of laminated ceramic green sheets, a plurality of internal electrode conductive paste layers, a pair of principal surfaces opposed to each other in a height direction, a pair of end surfaces opposed to each other in a length direction orthogonal or substantially orthogonal to the height direction, and a pair of side surfaces opposed to each other in a width direction orthogonal or substantially orthogonal to the height direction and the length direction;
preparing an external electrode conductive paste including at least Ni particles and Sn particles;
applying the external electrode conductive paste in a cap shape to at least the end surfaces of the unfired capacitive body and the principal surfaces and the side surfaces connected to the end surfaces; and
simultaneously firing the unfired capacitive body and the external electrode conductive paste; wherein
in the external electrode conductive paste, a weight of Sn particles is greater than or equal to about 1 wt % and less than or equal to about 15 wt % with respect to a total of the weight of the Ni particles and the weight of the Sn particles.

15. The method for manufacturing the multilayer ceramic capacitor according to claim 14, wherein a temperature of the firing is greater than or equal to a melting temperature of Sn and lower than a melting temperature of Ni.

* * * * *